US012620172B2

(12) United States Patent
Hassbring et al.

(10) Patent No.: US 12,620,172 B2
(45) Date of Patent: May 5, 2026

(54) METHOD AND IMAGE-PROCESSING DEVICE FOR DETECTING A REFLECTION OF AN IDENTIFIED OBJECT IN AN IMAGE FRAME

(71) Applicant: Axis AB, Lund (SE)

(72) Inventors: Ludvig Hassbring, Lund (SE); Mikael Murstam, Lund (SE)

(73) Assignee: AXIS AB, Lund (SE)

( * ) Notice: Subject to any disclaimer, the term of this patent is extended or adjusted under 35 U.S.C. 154(b) by 220 days.

(21) Appl. No.: 18/613,146

(22) Filed: Mar. 22, 2024

(65) Prior Publication Data

US 2024/0331283 A1 Oct. 3, 2024

(30) Foreign Application Priority Data

Mar. 30, 2023 (EP) .................................... 23165670

(51) Int. Cl.
*G06T 17/00* (2006.01)
*G06T 7/90* (2017.01)
(Continued)

(52) U.S. Cl.
CPC ................ *G06T 17/00* (2013.01); *G06T 7/90* (2017.01); *G06V 10/25* (2022.01); *G06V 10/56* (2022.01); *G06V 10/60* (2022.01); *G06V 20/52* (2022.01); *G06T 2207/10024* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 11,282,178 | B2 * | 3/2022 | Park | G06V 20/00 |
| 12,322,037 | B2 * | 6/2025 | Lu | G06T 7/12 |

FOREIGN PATENT DOCUMENTS

| | | | | |
|---|---|---|---|---|
| CN | 108090947 A | | 5/2018 | |
| CN | 112991507 A | * | 6/2021 | G06T 15/205 |

OTHER PUBLICATIONS

Klinker, Gudrun, Steven A. Shafer, and Takeo Kanade. "Color Image Analysis With An Intrinsic Reflection Model." ICCV. 1988. ( Year: 1988).*

(Continued)

*Primary Examiner* — Devona E Faulk
*Assistant Examiner* — Dan F Kalhori
(74) *Attorney, Agent, or Firm* — XSENSUS LLP

(57) ABSTRACT

An image-processing device generates a three-dimensional model of a background scene of the image frame based on three-dimensional information about the background scene. The image-processing device defines a three-dimensional bounding box of the object in the three-dimensional model. The image-processing device defines a centre coordinate in the three-dimensional model and a colour value of surface elements of the three-dimensional bounding box. The image-processing device determines a three-dimensional coordinate of a surface in the three-dimensional model which reflects light from a surface element into the camera, by tracing rays from the centre coordinate and based on a normal of the surface. The image-processing device further identifies a first pixel in the image frame corresponding to the three-dimensional coordinate and detects the reflection of the object.

13 Claims, 16 Drawing Sheets

(51) Int. Cl.

| | |
|---|---|
| ***G06V 10/25*** | (2022.01) |
| ***G06V 10/56*** | (2022.01) |
| ***G06V 10/60*** | (2022.01) |
| ***G06V 20/52*** | (2022.01) |

(56) References Cited

OTHER PUBLICATIONS

Fang et al., "Reconstructing 3D Human Pose by Watching Humans in the Mirror", 2021 IEEE/CVF Conference on Computer Vision and Pattern Recognition (CVPR), Jun. 20, 2021, pp. 12809-12818.

* cited by examiner

Start 1001 obtain a background image frame 1002 obtain an image frame and identify an object in the image frame 1003 generate a 3-D model of a background scene 1004a define identified object based on image information in image frame 1004b define 3-D bounding box of the object in the three-dimensional model 1005 define surface elements of the 3-D bounding box 1006 determine 3-D coordinate of a surface in the 3-D model of the background scene which reflects light from a surface element of the 3-D bounding box 1007 identify a pixel in the image frame which corresponds to the determined 3-D coordinate of the surface 1008 detect the pixel in the image frame which reflects the object when a mixing of a first colour value of the identified pixel and a colour value of the surface element of the object and a ground truth colour value of the identified pixel fulfils a mixing criteria End

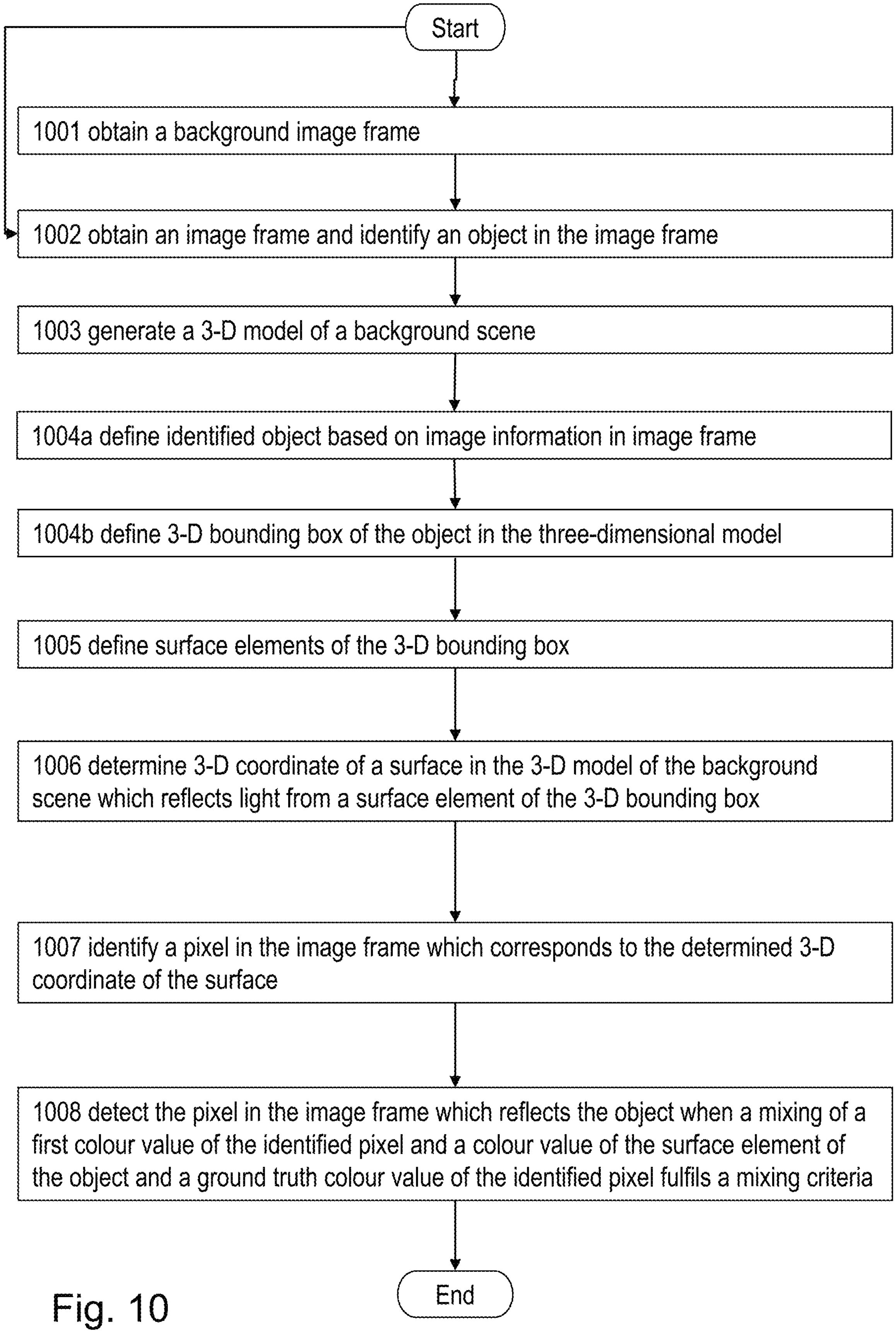

Fig. 10

METHOD AND IMAGE-PROCESSING DEVICE FOR DETECTING A REFLECTION OF AN IDENTIFIED OBJECT IN AN IMAGE FRAME

CROSS-REFERENCE TO RELATED APPLICATION

This application claims priority to European Patent Application No. 23165670.3 filed on Mar. 30, 2023, the entire disclosure of which is incorporated by reference herein.

TECHNICAL FIELD

The embodiments herein relate to a method and an image-processing device for detecting a reflection of an identified object in an image frame. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

However, there may be requirements to not be able to identify persons from the video surveillance. The requirement to not be able to identify persons may be in conflict with the requirement of being able to determine what is happening in the video. For example, it may be of interest to perform people counting or queue monitoring on anonymous image data. In practice, there is a trade-off between meeting these two requirements: non-identifiable video and extracting large amounts of data for different purposes such as people counting.

Several image-processing techniques have been described to avoid identifying persons while still being able to recognize activities. For example, edge detection/representation, edge enhancement, silhouetting objects, and different sorts of "colour blurring", such as colour variation or dilation are such examples of manipulations. Privacy masking is another image-processing technique used in video surveillance to protect personal privacy by concealing parts of an image from view with a masked area.

Image processing refers to any processing that is applied to an image. The processing can include application of various effects, masks, filters or the like, to the image. In this manner, the image can e.g. be sharpened, converted to grey scale, or altered in some way. The image has typically been captured by a video camera, a still image camera or the like.

As mentioned above one way to avoid identification of persons is by masking moving people and objects in images in real time. Masking in live and recorded video can be done by comparing a live camera view with a set background scene and applying dynamic masking to areas of change-essentially moving people and objects. Color masking, which may also be referred to solid color masking or monochrome masking where an object is masked by an overlaid solid mask of a certain color, provides privacy protection while enabling you to see movements. Mosaic masking, also referred to as pixelation, pixelated privacy masking or transparent pixelated masking shows moving objects in lower resolution and allows you to better distinguish forms by seeing an object's colors.

Masking live and recorded video is suitable for remote video monitoring or recording in areas where surveillance is otherwise problematic due to privacy rules and regulations. It's ideal for processing, manufacturing and logistics applications when video surveillance is primarily used to monitor processes. Other potential applications are in retail, education and at government facilities.

Although masking techniques evolve there is still room for improvement. One problem that may arise is that reflective surfaces in a scene may reflect what is behind a privacy mask into a camera capturing the scene.

This problem is especially tricky for dynamic masks, which are expected to move with the object. Document CN 108 090 947 A discloses a ray tracing optimization method for 3D scenes.

SUMMARY

An object of embodiments herein may thus be to obviate some of the problems mentioned above, or at least reduce the impact of them. Specifically, an object of embodiments herein may be to identify pixels in an image that represent surfaces in the scene that reflect an object into a camera such that it is possible to apply image processing to the pixels representing those reflective surfaces. The reflections may, for example, be masked as well to provide improved anonymization.

Embodiments herein solve the above problems by creating a three-dimensional representation of a scene captured by an image frame from a camera, including an identified masked object, and tracing optical rays in the three-dimensional representation of the scene from the identified object to the camera via reflecting surfaces in the scene. However, only those reflecting surfaces that are sufficiently similar to the actual object itself will be detected as reflecting the object. Specifically, only those reflecting surfaces that produce a reflection which colour value matches a colour value of the object being reflected will be detected. Comparison of the colour value is performed by mixing colour values of pixels of the image frame representing the object, the reflecting surface and pixels of a background image frame representing the reflecting surface without influence from the object.

According to an aspect, the object is achieved by a method, performed by an image-processing device for detecting a reflection of an identified object in an image frame captured by a camera. The method comprises generating a three-dimensional model of a background scene of the image frame based on obtained three-dimensional information about the background scene.

The method further comprises defining the identified object in the image frame based on image information in the image frame.

The method further comprises defining a three-dimensional bounding box of the defined object in the three-dimensional model of the background scene.

The method further comprises defining surface elements of the three-dimensional bounding box, a respective surface element being defined by a centre coordinate in the three-dimensional model of the background scene and a colour value.

The method further comprises determining a three-dimensional coordinate of a surface in the three-dimensional model of the background scene which reflects light from a surface element of the three-dimensional bounding box of the object into the camera, wherein the determining is performed by tracing rays from the centre coordinate of the surface element of the three-dimensional bounding box of the object and based on a normal of the surface in the three-dimensional model of the background scene at said three-dimensional coordinate.

The method further comprises identifying a first pixel in the image frame which corresponds to the determined three-dimensional coordinate of the surface.

The method further comprises detecting the reflection of the object when a mixing of a first colour value of the identified first pixel and a colour value of the surface element of the object and a ground truth colour value of the identified first pixel fulfils a mixing criteria.

The ground truth represents the reflecting surface without influence from the object. The ground truth colour value may be obtained from one or more background image frames or from one or more neighbouring pixels to the identified first pixel in the image frame.

According to another aspect, the object is achieved by an image-processing device configured to perform the above method.

According to further aspects, the object is achieved by a computer program and a computer program carrier corresponding to the aspects above. Although embodiments have been summarized above the claimed subject matter is defined by the accompanying claims.

Embodiments herein find candidate reflective pixels in an image frame by ray tracing optical rays from the object to the camera in the three-dimensional model of the scene captured in the image frame and corroborate detection of reflective pixels by comparing colour values of pixels of the object and pixels of the reflecting surface. A ground truth value of the reflecting pixels is also used to achieve an unbiased result.

Thus, the image-processing device will only detect reflecting pixels that are similar enough to the object.

BRIEF DESCRIPTION OF THE DRAWINGS

The various aspects of embodiments disclosed herein, including particular features and advantages thereof, will be readily understood from the following detailed description and the accompanying drawings, in which:

FIG. 10 is a flowchart illustrating embodiments of a method in an image-processing device.

DETAILED DESCRIPTION

Embodiments disclosed herein are directed to improving detection of pixels representing reflections of detected objects in an image frame, such as an image frame in a video stream.

Specifically, embodiments disclosed herein are directed to improving anonymization of image frames.

Figure 1:
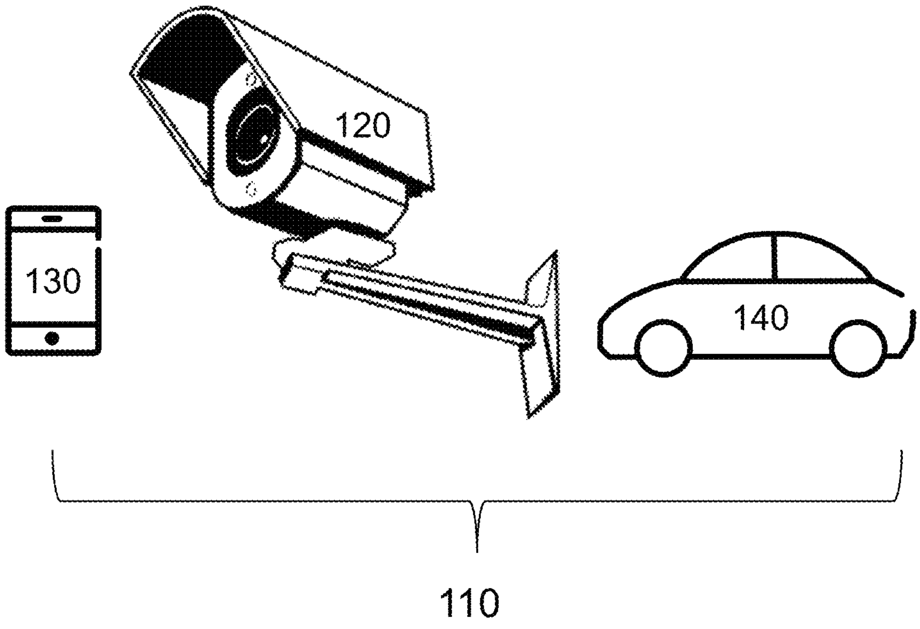
FIG. 1 illustrates exemplifying embodiments of image-capturing devices.

Thus, embodiments herein may be implemented in an image-processing device. In some embodiments herein the image-processing device may comprise or be an image-capturing device such as a digital camera. FIG. 1 depicts various exemplifying image-capturing devices 110. The image-capturing device 110 may e.g., be or comprise any of a camcorder, a network video recorder, a camera, a video camera 120 such as a surveillance camera or a monitoring camera, a digital camera, a wireless communication device 130, such as a smartphone, including an image sensor, or a car 140 including an image sensor.

Figure 2:
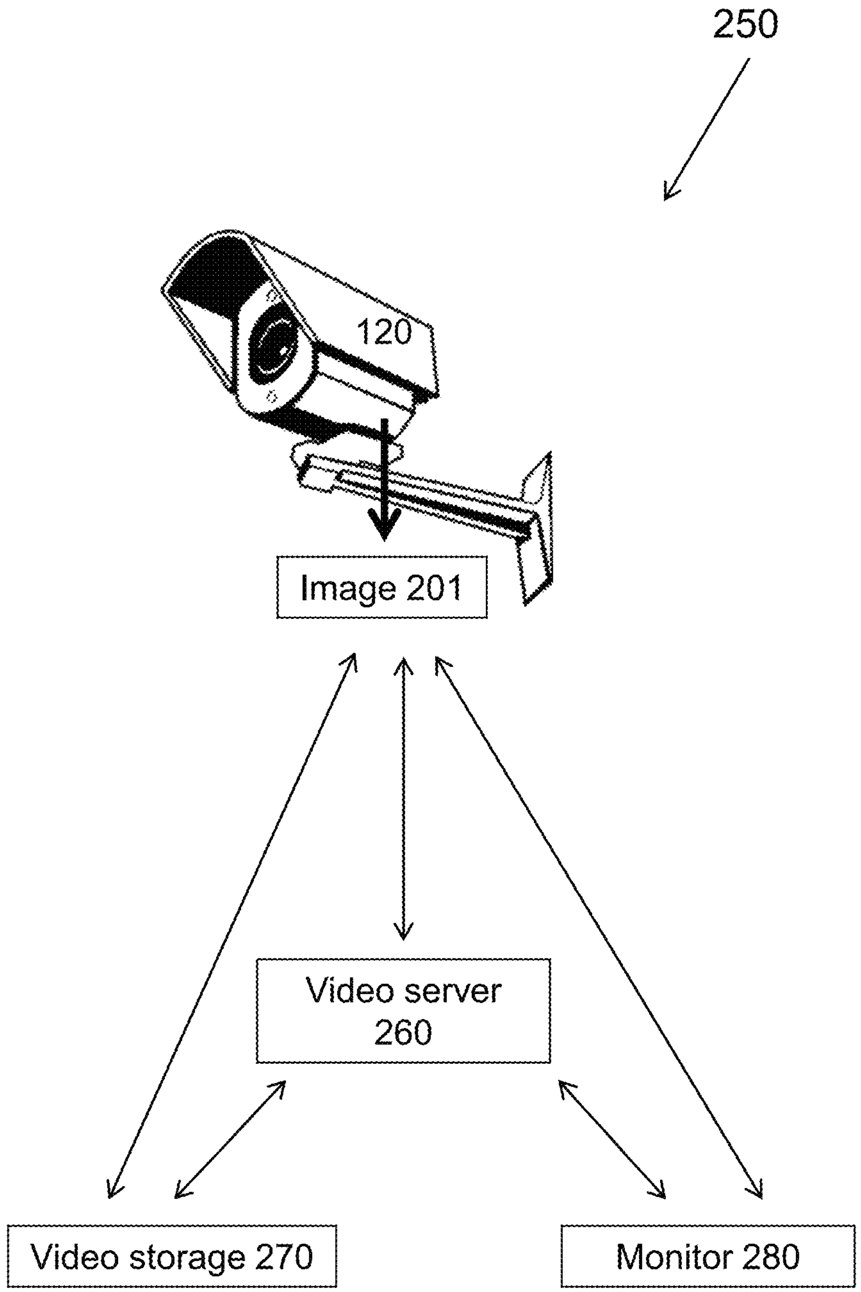
FIG. 2 illustrates exemplifying embodiments of a video network system.

FIG. 2 depicts an exemplifying video network system 250 in which embodiments herein may be implemented. The video network system 250 may include an image-capturing device, such as the video camera 120, which can capture and perform image processing on a digital image 201, such as a digital video frame. A video server 260 in FIG. 2 may obtain the video frame, for example from the video camera 120 over a network or the like, which is indicated in FIG. 2 with the double-pointing arrows. In some embodiments herein the image-processing device may comprise or be the video server 260.

The video server 260 is a computer-based device that is dedicated to delivering video.

However, in FIG. 2, the video server 260 is connected over the video network system 250, to the image-capturing device, here exemplified by the video camera 120. The video server 260 may further be connected to a video storage 270 for storage of video frames, and/or connected to a monitor 280 for display of video frames. In some embodiments the video camera 120 is connected directly with the video storage 270 and/or the monitor 280, as indicated by the direct arrows between these devices in FIG. 2. In some other embodiments the video camera 120 is connected to the video storage 270 and/or the monitor 280 via the video server 260, as indicated by the arrows between the video server 260 and the other devices.

Figure 3:
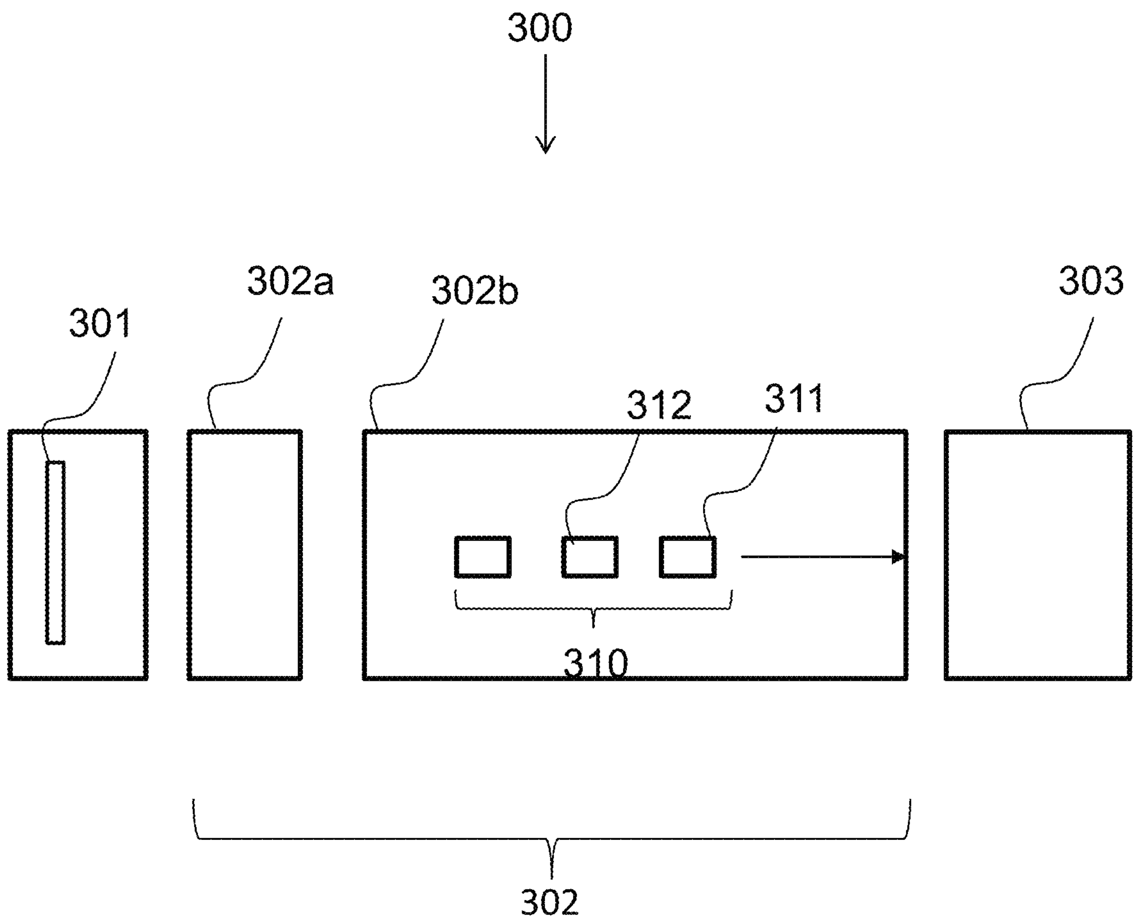
FIG. 3 is a schematic block diagram illustrating an exemplifying embodiment of an imaging system.

FIG. 3 is a schematic view of an imaging system 300, in this case of a digital video camera, such as the video camera 120. The imaging system 300 images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301, different image processing actions may be performed by an image signal processor 302. The image signal processor 302 may comprise an image processing part 302*a*, sometimes referred to as an image processing pipeline, and a video post-processing part 302*b*.

Typically for video processing the images are comprised in a stream of images, also referred to as a stream of video frames. FIG. 3 illustrates a video stream 310 from the image sensor 301. The video stream 310 may comprise multiple captured video frames, such as a first captured video frame 311 and a second captured video frame 312. The stream of images may also be referred to as a video sequence.

Image processing may comprise application of overlays (e.g., privacy masks, explanatory text). The image signal processor 302 may also be associated with an analytics engine performing object detection, recognition, alarms, etc.

The image processing part 302*a* may e.g. perform image stabilization, apply noise filtering, distortion correction, global and/or local tone mapping, transformation, and flat-field correction. The video post-processing part 302*b* may for example crop parts of an image, apply overlays, and comprise the analytics engine. Thus, embodiments disclosed herein may be implemented by the video post-processing part 302*b*.

Following the image signal processor 302 the image may be forwarded to an encoder 303, wherein the information in the video frames is coded according to an encoding protocol, such as H.264. The encoded video frames are then forwarded to for example a receiving client, exemplified here with the monitor 280, to the video server 260, the storage 270, etc.

As mentioned above, an object of embodiments herein may be to improve detection of pixels representing reflections of detected objects in an image frame.

Figure 4:
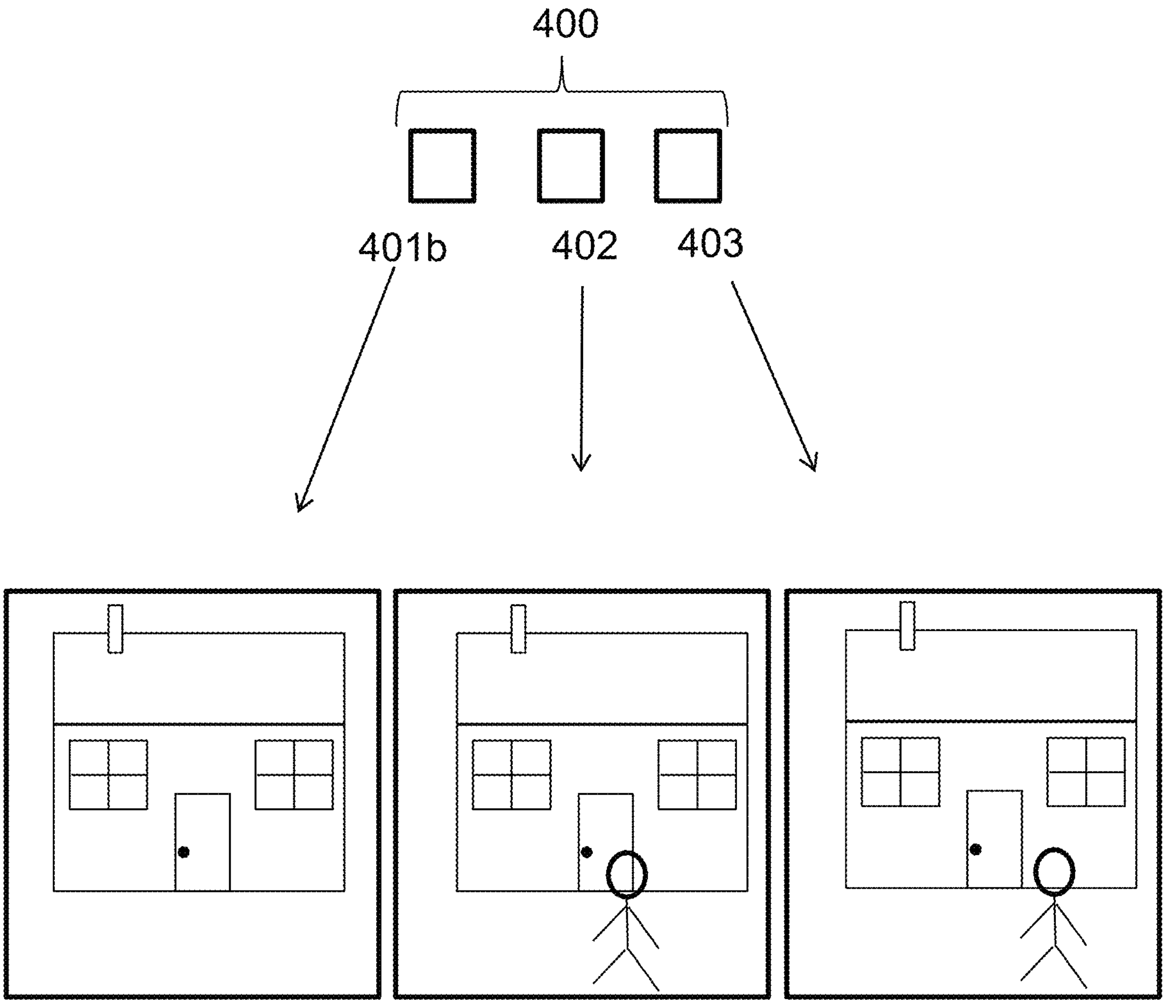
FIG. 4 is a schematic block diagram illustrating a stream of image frames and their content.

FIG. 4 illustrates a video sequence 400 corresponding to the video stream 310 of FIG. 3. The video sequence 400 comprises a plurality of image frames. For example, the video sequence 400 comprises an image frame 402, which may also be referred to as a first image frame 402. The video sequence 400 further comprises a second image frame 403. The video sequence 400 may also comprise a background image frame 401*b*. In some embodiments herein the background image frame 401*b* may be derived from multiple image frames of the video sequence 400. Then the background image frame 401*b* is not necessarily part of the video sequence 400. Instead it may be stored on the image-processing device and retrieved when needed. The background image frame 401*b* may be derived from multiple image frames of the video sequence 400 by averaging the multiple image frames.

The lower part of FIG. 4 illustrates content of the background image frame 401*b*, the image frame 402 and the second image frame 403. The content of the background image frame 401*b* may comprise background objects such as a house. Preferably the background objects of the background image frame 401*b* are stationary such that they are also present at the same pixel locations in other image frames. The content of the image frame 402 and the second image frame 403 may comprise both background objects and foreground objects. The foreground objects may be moving in the scene and thus may be represented by different pixels in different image frames as illustrated by a moving person in FIG. 4.

Figure 5:
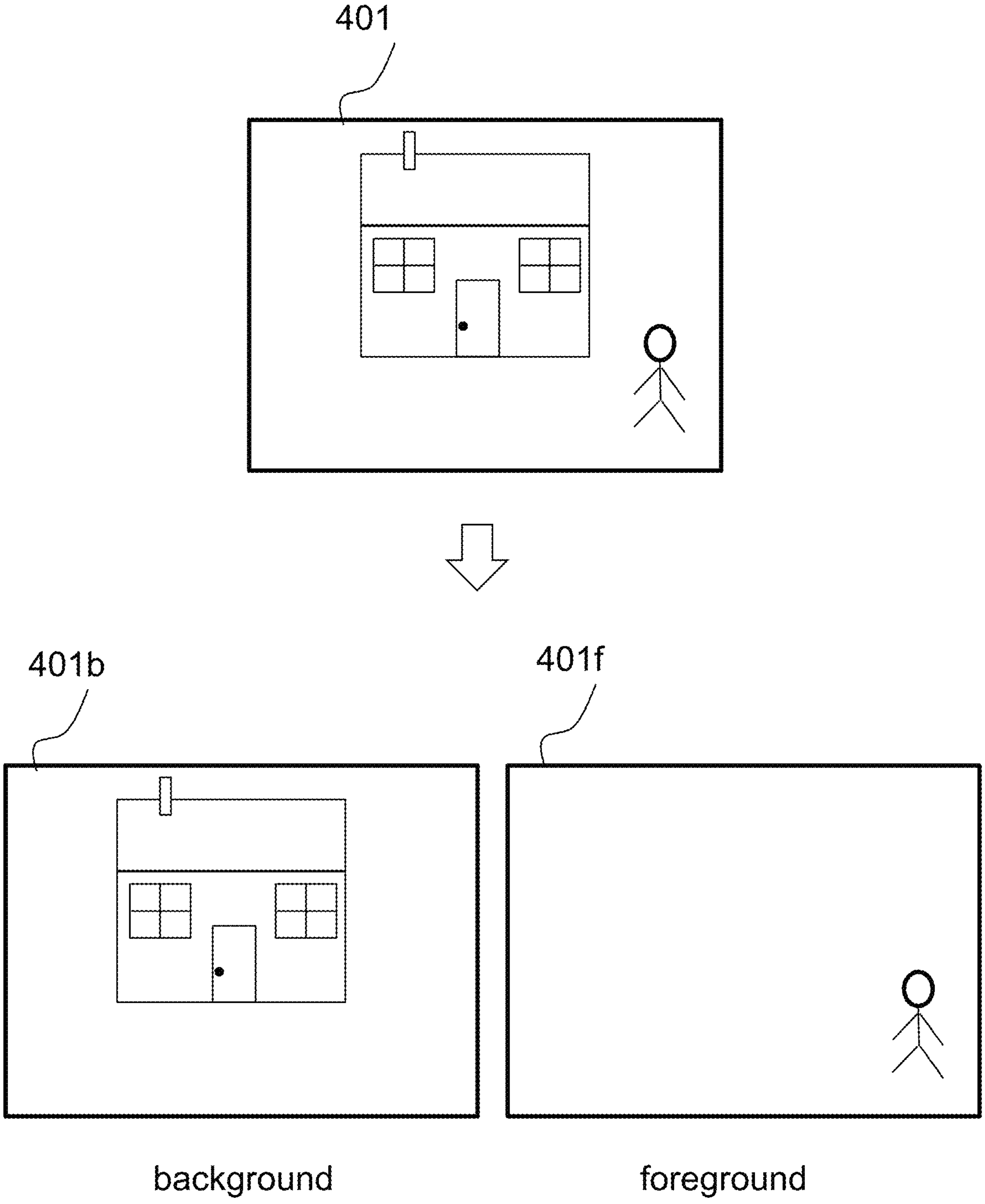
FIG. 5 is a schematic block diagram illustrating embodiments of a method in the image-processing device.

FIG. 5 illustrates a simplified method of obtaining the background image frame 401*b* from an image frame, such as an image frame 401, comprising a scene with different objects which may be classified as background objects and foreground objects according to some criteria. The background image frame 401*b* may be generated from the image frame 401 and may comprise the background objects of the image frame 401. Correspondingly, a foreground image frame 401*f* may be generated and may comprise the foreground objects of the image frame 401.

Figure 6:
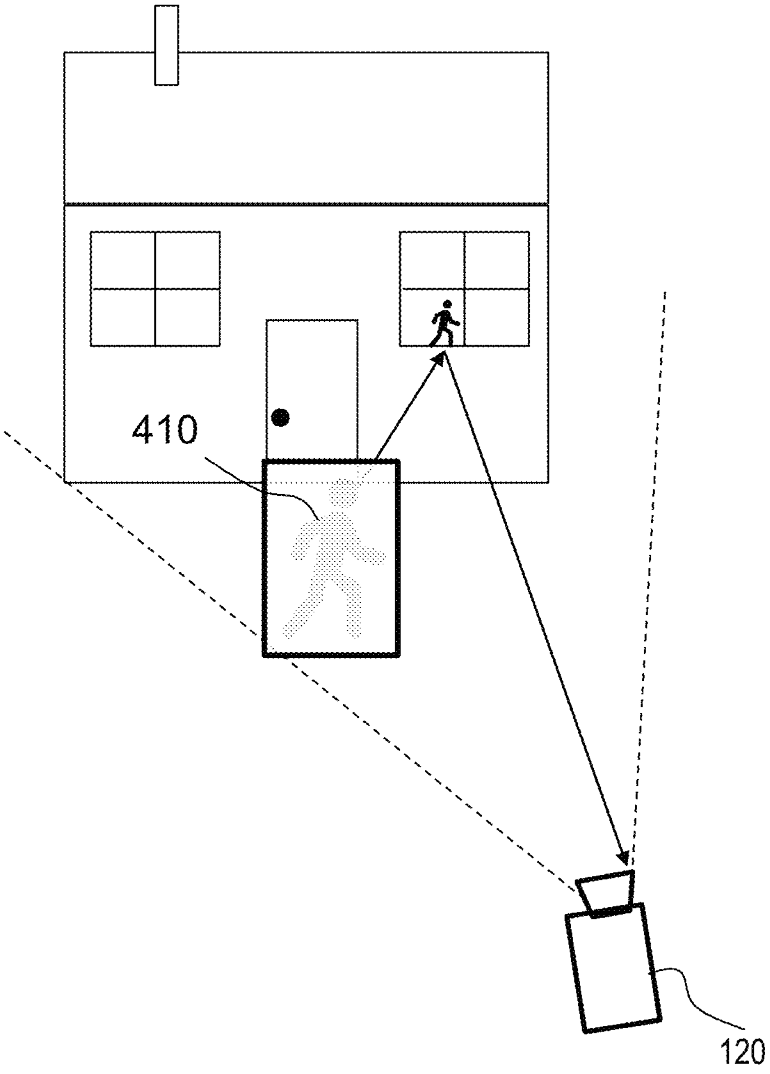
FIG. 6 is a schematic block diagram illustrating a reference method for masking objects in an image frame.

To appreciate the advantages of embodiments disclosed herein a reference method will first be described. FIG. 6 is a schematic block diagram illustrating the reference method for masking objects in an image frame. More specifically, FIG. 6 illustrates a part of an image frame captured by the video camera 120.

The video camera 120 captures a scene with background and foreground objects. Specifically, an object 410 is captured and detected as a foreground object. If the object 410 has been detected as a person it may be masked in order to anonymize the person. As mentioned above one way to avoid identification of persons is by masking moving people and objects in images in real time. Masking in live and recorded video may be done by comparing a live camera view with a set background scene and applying dynamic masking to areas of change-essentially moving people and objects. Color masking, which may also be referred to solid color masking or monochrome masking where an object is masked by an overlaid solid mask of a certain color, provides privacy protection while enabling you to see movements. Mosaic masking, also referred to as pixelation, pixelated privacy masking or transparent pixelated masking shows moving objects in lower resolution and allows you to better distinguish forms by seeing an object's colors.

However, one problem that may arise is that a reflective surface in the scene, such as a window illustrated in FIG. 6, may reflect what is behind a privacy mask into the video camera 120 capturing the scene.

An object of embodiments herein may therefore be to identify pixels in an image frame that represent surfaces in the scene that reflect the object 410 into the video camera 120 such that it is possible to apply image processing to the pixels representing those reflective surfaces. The reflections may, for example, be masked as well to provide improved anonymization.

Exemplifying embodiments for detecting a reflection of the identified object 410 in the image frame 402 captured by the camera 120, will now be described with reference to FIG. 7*a*, FIG. 7*b*, FIG. 8, FIG. 9*a*, FIG. 9*b*, FIG. 9*c*, FIG. 9*d* and FIG. 9*e*, and with further reference to FIGS. 2, 3 and 4.

Figure 7A:
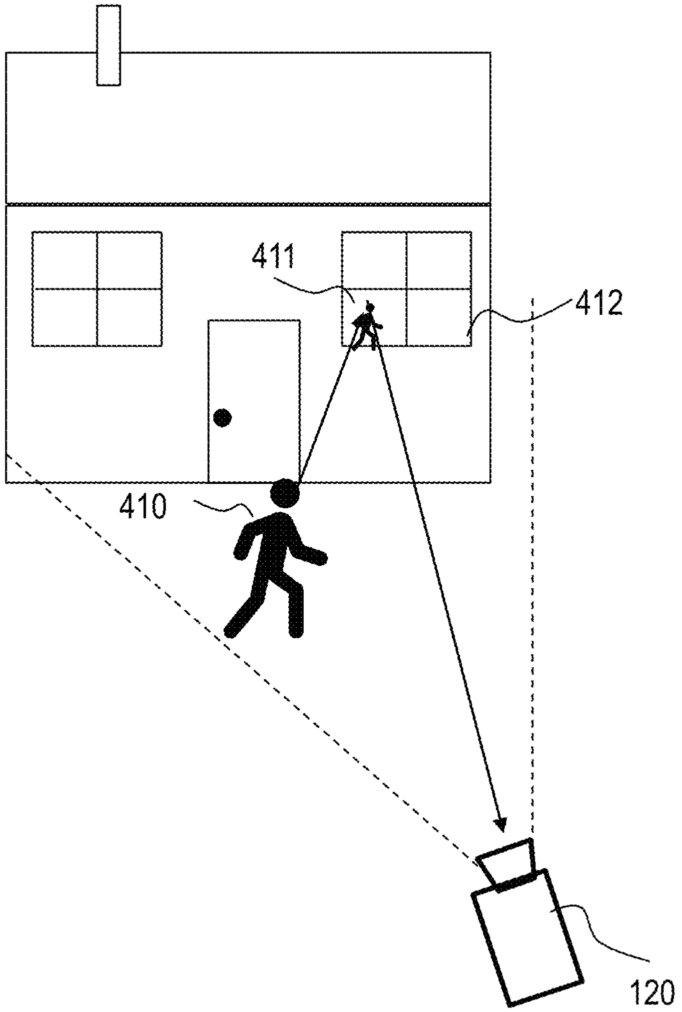
FIG. 7*a* is a schematic block diagram illustrating a first scenario in which embodiments disclosed herein may be implemented.

In a scenario in which embodiments herein may be implemented the video camera 120 captures the video sequence 400. The video sequence 400 captures a scene comprising background and foreground objects. In the case of FIG. 7*a*, illustrating a part of an image frame of the video sequence 400, one of the background objects is a house and one of the foreground objects is a person. Detected persons are to be masked. However, the background house comprises reflective surfaces, such as windows, which reflect the person into the video camera 120. Thus, an image of the person is present in the reflective surfaces. The background may for example comprise a first reflective surface 411 and a second reflective surface 412. In general, the reflective surface is part of a background object.

The image frame 402 comprises pixels representing an image of the object 410 which is detected as a person, i.e., an object to be masked. However, the image frame 402 also comprises pixels representing an image of the first and second reflective surfaces 411, 412.

Figure 7B:
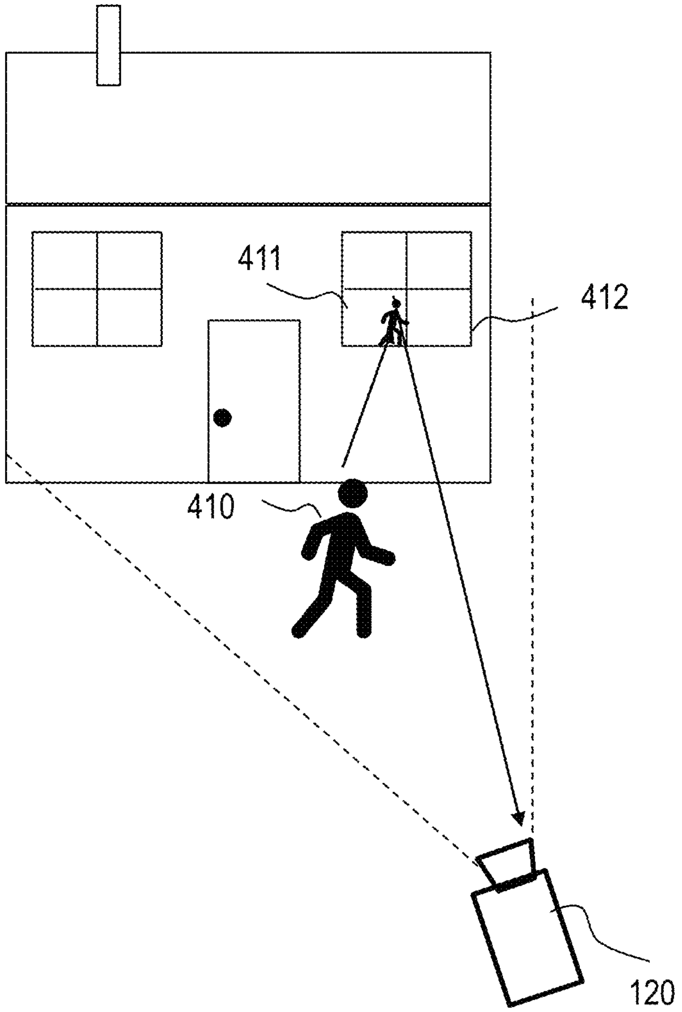
FIG. 7*b* is a schematic block diagram illustrating a second scenario in which embodiments disclosed herein may be implemented.

FIG. 7b represents the scene of FIG. 7a captured with the second image frame 403, i.e., slightly after the first image frame 402. In FIG. 7b the object 410 has moved slightly with respect to the background. Also the image of the object 410 in the reflective surface 411 has moved.

Figure 8:
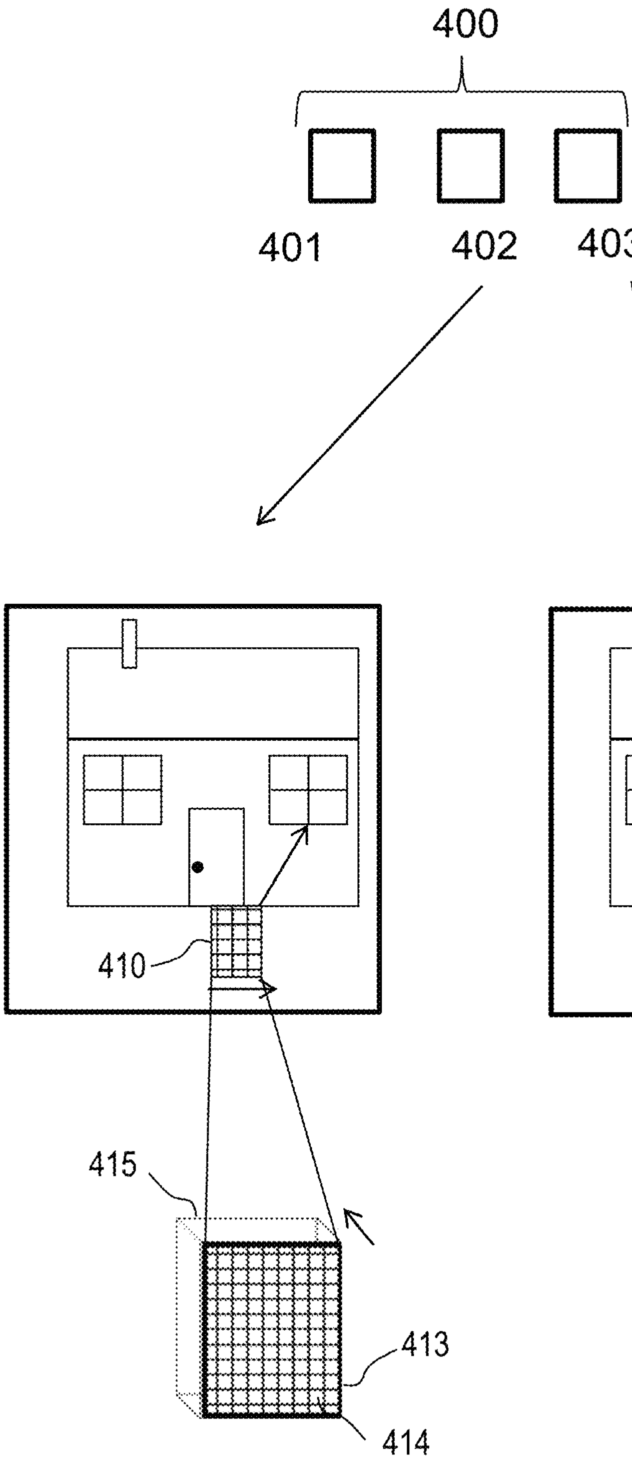
FIG. 8 is a schematic block diagram illustrating embodiments of a method in the image-processing device.

FIG. 8 illustrates content of the first image frame 402 and content of the second image frame 403. The image-processing device 120, 260 may define the identified object 410 in the image frame 402 by a two-dimensional bounding box 413. In FIG. 8 the object 410 is illustrated as a rectangle for simplicity. The two-dimensional bounding box 413 may be defined by its coordinates in the image frame 402. Further, a surface of the two-dimensional bounding box 413 may be divided into surface elements 414. Each surface element 414 of the two-dimensional bounding box 413 may be defined by its two-dimensional coordinate in the image frame 402 and by a colour value, such as a hue value. The colour value may be obtained by calculating an average colour value of pixels within the surface element 414.

Embodiments herein are based on finding reflective surfaces that potentially may reflect the object into the camera 120 by tracing rays in a three-dimensional model of the scene. To do so embodiments herein define a three-dimensional bounding box 415 of the defined object 410 in the three-dimensional model of the background scene, e.g., based on the defined object 410 in the image frame 402 an obtained position of the object 410 in the three-dimensional model and by extrapolating the defined object 410 in a plane extending along the normal of the image plane, i.e. along the depth plane of the image.

Figure 9A:
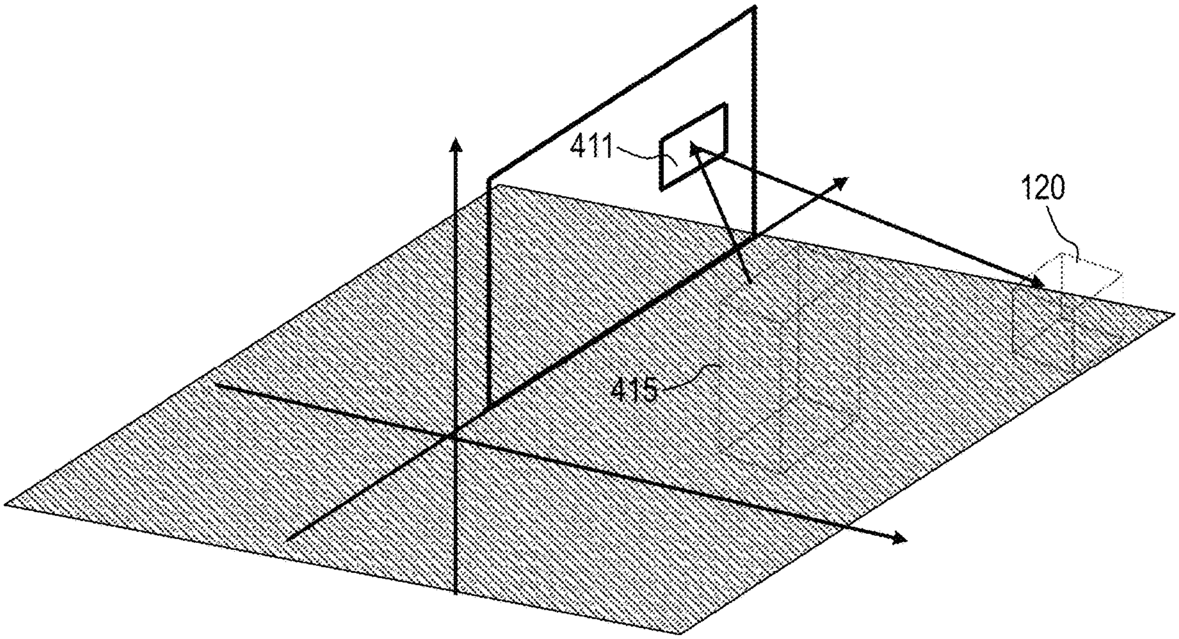
FIG. 9*a* is a schematic block diagram illustrating embodiments of a method in the image-processing device.

FIG. 9a illustrates a simplified three-dimensional model of the scene including the three-dimensional bounding box 415, the camera 120 and the reflective surface 411 of the background. The reflective surface 411 of the background is drawn as a two-dimensional sheet in FIG. 9a for simplicity.

The two-dimensional bounding box 413 and the surface elements 414 of the two-dimensional bounding box 413 may be used to extrapolate the defined object 410 in the depth plane. For example, the three-dimensional bounding box 415 may be generated by extrapolating the two-dimensional bounding box 413. Surfaces of the three-dimensional bounding box 415 may be generated based on the surface elements 414 of the two-dimensional bounding box 413.

Figure 9B:
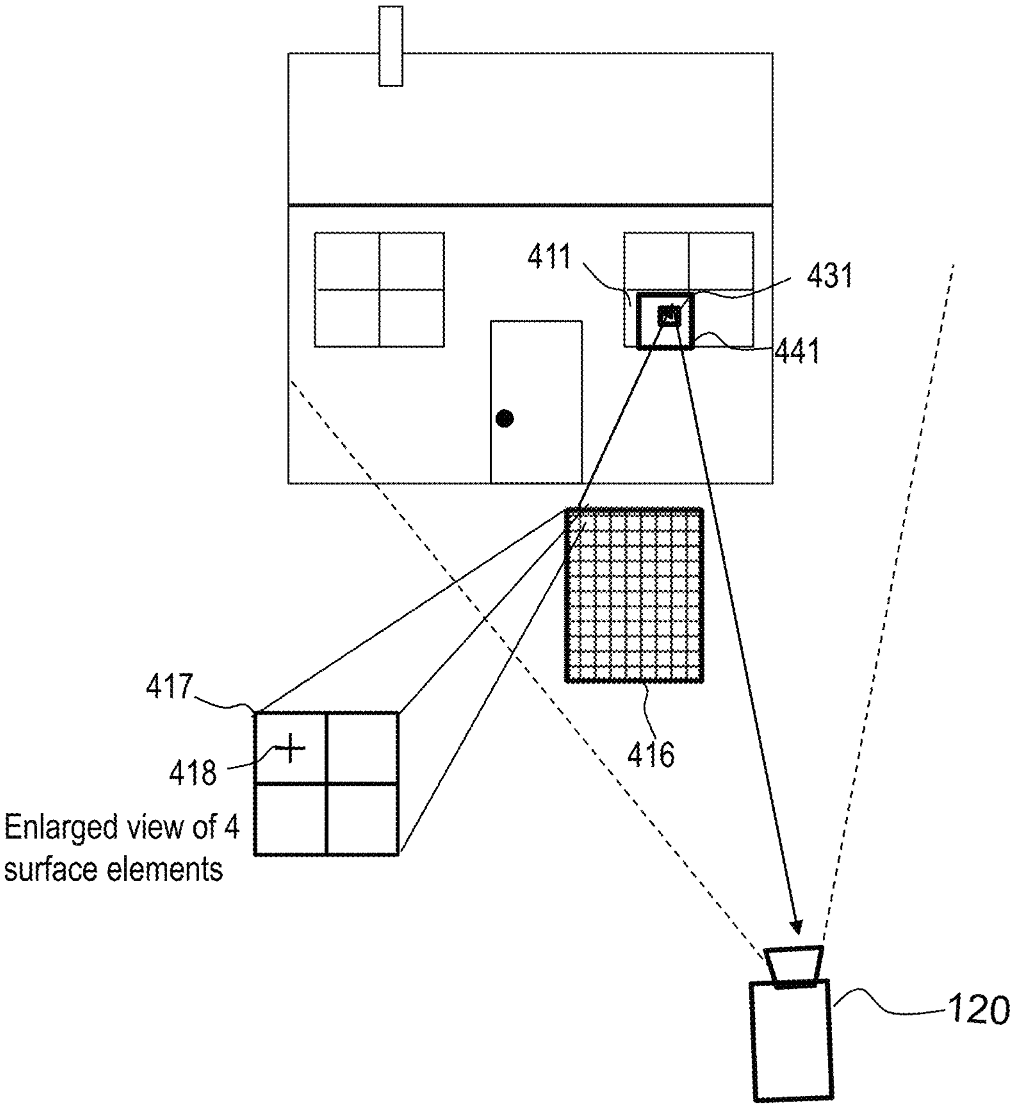
FIG. 9*b* is a schematic block diagram illustrating embodiments of a method in the image-processing device.

FIG. 9b schematically illustrates a part of the background model which comprises the first reflective surface 411. FIG. 9b further schematically illustrates how a light ray from a back surface 416 of the three-dimensional bounding box 415 is reflected from the first reflective surface 411 into the camera 120. FIG. 9b further schematically illustrates parts of the background image frame 401b, overlaid on the background model, which correspond to at least a part of the first reflective surface 411. The back surface 416 of the three-dimensional bounding box 415 may comprise surface elements 417 of the three-dimensional bounding box 415 which are copies of the surface elements 414 of the two-dimensional bounding box 413. Side surfaces of the three-dimensional bounding box 415 may be generated as copies of bounding surface elements 414 of the two-dimensional bounding box 413. A colour of the copied surface elements may be preserved.

FIG. 10 illustrates a flowchart describing a method performed in the image-processing device for detecting the reflection of the identified object 410 in the image frame 402 captured by the camera 120.

The method may be performed by an image-processing device, such as the video camera 120 or the video server 260.

The below actions may be taken in any suitable order, e.g., in another order than the order presented below.

Action 1001

The background image frame 401b may be generated according to known methods. Background objects may be identified and defined in the background image frame 401b.

Preferably, the background image frame 401b does not comprise the foreground object 410.

Action 1002

The image frame 402 may be obtained. The object 410 in the image frame 402 may be identified from image information in the image frame 402. For example, an object identification algorithm may be used to find objects in the scene.

Action 1003

A three-dimensional model of the background scene of the image frame 401 is generated based on obtained three-dimensional information about the background scene. The background scene may for example be a room.

The three-dimensional model of the background scene comprises spatial information about the background objects, such as position, size and orientation of surfaces of the background objects. For example, the three-dimensional model of the background scene may comprise information about the direction of a normal of a surface of a background object. The normal may be used for ray tracing.

The three-dimensional information about the background scene may comprise three-dimensional coordinates of surfaces in the background scene, a respective normal vector of the surfaces, three-dimensional coordinates of the camera 120 and an orientation of the camera 120. For example, the three-dimensional model of the background scene may comprise information about a position of the camera 120 in relation to a position of the background object.

The three-dimensional information about the background scene may be generated from Light Detection And Ranging (LIDAR).

In some other embodiments the three-dimensional information about the background scene may be obtained by running a Neural Network with the background image frame 401b as input data.

The three-dimensional model of the background scene is linked to the background image frame 401b. For example, there is a mapping between three-dimensional coordinates of the surfaces of the background model and the corresponding pixels of the background image frame 401b. Mapping image data on top of for example LIDAR data is known in the art.

The three-dimensional model of the background scene may be updated when the background image frame 401b is updated.

In some embodiments herein the three-dimensional model of the background scene is modified by removing surfaces of the background objects which normal is directed towards the camera 120 since reflected light from these surfaces is not likely to reach the camera.

Action 1004*a*

The image-processing device 120, 260 defines the identified object 410 in the image frame 402 based on image information in the image frame 402.

For example, the image-processing device 120, 260 may define the identified object 410 in the image frame 402 by the two-dimensional bounding box 413. A position of the identified object 410 in the image frame 402 may be defined.

Action 1004*b*

The image-processing device 120, 260 defines the three-dimensional bounding box 415 of the defined object 410 in the three-dimensional model of the background scene. The three-dimensional bounding box 415 may be a cuboid. A bounding box may contain any shape and may simplify the computation. An arbitrary shape may fit inside the bounding box 415. In some embodiments herein the three-dimensional bounding box 415 comprises one or more voxels. The three-dimensional bounding box 415 may be based on the defined object 410 in the image frame 402, an obtained position of the object 410 in the three-dimensional model and by extrapolating the defined object 410 in a plane extending along the normal of the image plane. The plane extending along the normal of the image plane may also be referred to as the depth plane of the image.

The image-processing device 120, 260 may extrapolate the object 410 by extrapolating bounding pixels of the object 410 from the captured image frame 402.

In some example embodiments pixels of the object 410 are extrapolated a certain distance in the plane of the normal of the image plane. For instance, a car has a fairly uniform length, which may be used to carry out the extension.

The back surface 416 of the three-dimensional bounding box 415 may comprise pixels being copies of the pixels of the object 410 of the image frame 402, that is pixels within the two-dimensional bounding box 413. Side surfaces of the three-dimensional bounding box 415 may comprise pixels being copies of the pixels of the bounding pixels of the object 410 of the image frame 402. A colour of the copied pixels is preserved.

The obtained position of the object 410 in the three-dimensional model may be obtained by three-dimensional detection of the object 410, such as based on LIDAR, RADAR, or depth estimation Artificial Intelligence (AI) based on the image information in the image frame 402.

In some other embodiments the three-dimensional bounding box 415 is based directly on a three-dimensional mapping of the object 410, such as based on LIDAR, or depth estimation Artificial Intelligence (AI).

Action 1005

The image-processing device 120, 260 defines surface elements 417 of the three-dimensional bounding box 415. Smaller surface elements 417 means better accuracy, but worse performance.

A respective surface element 417 being defined by a centre coordinate 418 in the three-dimensional model of the background scene and a colour value.

The colour value may be a hue value or a combination of Cb and Cr values in the YUV format. Other colour values are also possible.

Hue is one of the main properties called colour appearance parameters of a colour, defined technically in the CIECAM02 model as "the degree to which a stimulus can be described as similar to or different from stimuli that are described as red, orange, yellow, green, blue, violet," within certain theories of colour vision. Hue may typically be represented quantitatively by a single number, often corresponding to an angular position around a central or neutral point or axis on a colour space coordinate diagram, such as a chromaticity diagram, or colour wheel.

A respective surface element 417 of the three-dimensional bounding box 415 corresponds to multiple pixels from the captured image frame 402. The colour value of the respective surface element 417 is calculated as an average of colour values of the corresponding multiple pixels.

The colour value of the surface element 417 may be defined by averaging colour values of pixels within another surface element from which the surface element 417 has been derived. For example, the surface element 417 may be on the backside and may be derived from another surface element on the front side which is derived from a group of pixels of the image frame 402.

Action 1006

The image-processing device 120, 260 determines a three-dimensional coordinate of the surface 411 in the three-dimensional model of the background scene which reflects light from the surface element 417 of the three-dimensional bounding box 415 of the object 410 into the camera 120. That is, the determined three-dimensional coordinate of the surface 411 in the three-dimensional model of the background scene is positioned such that light that comes from the surface element 417 and is reflected by the surface 411 at this three-dimensional coordinate will be captured by the camera 120. However, an actual lighting condition of the scene may determine whether or not it is possible to detect a reflection of the object 410 in pixels of the image frame 402 corresponding to the three-dimensional coordinate of the surface 411. Thus, action 1006 is about finding candidate reflective coordinates of the surface 411.

The determined three-dimensional coordinate of the surface 411 in the three-dimensional model of the background scene may be stored.

The determining is performed by tracing rays from the centre coordinate 418 of the surface element 417 of the three-dimensional bounding box 415 of the object 410 and based on a normal of the surface in the three-dimensional model of the background scene at said three-dimensional coordinate.

The ray tracing may be repeated for multiple surface elements 417. For example, ray tracing may be performed from all surface elements of the three-dimensional bounding box 415. Then all corresponding three-dimensional coordinates of the surface 411 in the three-dimensional model of the background scene which reflect light from the surface elements 417 may be found.

In some other embodiments ray tracing is only performed for surface elements 417 that define the three-dimensional bounding box 415. In this way a contour of the projection of the three-dimensional bounding box 415 onto the surface 411 may be found and used later for determining which pixels of the image frame 402 to mask. This latter option requires less computations.

Ray tracing may be performed by known methods. Ray tracing is a method for calculating the path of waves or particles through a system with regions of varying propagation velocity, absorption characteristics, and reflecting surfaces. Under these circumstances, wavefronts may bend, change direction, or reflect off surfaces. Ray tracing solves the problem by repeatedly advancing idealized narrow beams called rays through the medium by discrete amounts.

When applied to problems of electromagnetic radiation, such as light, ray tracing often relies on approximate solutions to Maxwell's equations that are valid as long as the light waves propagate through and around objects whose dimensions are much greater than the light's wavelength.

Ray tracing works by assuming that the particle or wave can be modeled as a large number of very narrow beams (rays), and that there exists some distance, possibly very small, over which such a ray is locally straight. The ray tracer may advance the ray over this distance, and then use a local derivative of the medium to calculate the ray's new direction. From this location, a new ray is sent out and the process is repeated until a complete path is generated. If the simulation includes solid objects, the ray may be tested for intersection with them at each step, making adjustments to the ray's direction if a collision is found.

Action 1007

The image-processing device 120, 260 identifies a first pixel 431 in the image frame 402 which corresponds to the determined three-dimensional coordinate of the surface 411. The identified first pixel may be a candidate reflection pixel.

The image-processing device 120, 260 may identify multiple first pixels 431 in the image frame 402 which correspond to multiple determined three-dimensional coordinates of the surface 411.

Action 1008

The image-processing device 120, 260 detects the reflection of the object 410 in the image frame 402 when a mixing of a first colour value of the identified first pixel 431 and the colour value of the surface element 417 of the object 410 and a ground truth colour value of the identified first pixel 431 fulfils a mixing criteria. That is, the identified first pixel 431 is detected as a pixel reflecting the object if mixing of a first colour value of the identified first pixel 431 and the colour value of the surface element 417 of the object 410 and a ground truth colour value of the identified first pixel 431 fulfils a mixing criteria. The mixing criteria may for example be that the colour value of the identified first pixel 431 of the background image frame 401*b* is roughly an addition of the colour value of the surface element 417 of the object 410 and the ground truth colour value. This may be checked by subtracting the ground truth colour value from the colour value of the identified first pixel 431 and comparing the obtained value with the colour value of the surface element 417 of the object 410.

The ground truth colour value is a colour value of the identified first pixel 431 when there is no reflection from foreground objects.

The ground truth colour value may be obtained from one or more background image frames 401*b* or from one or more neighbouring pixels to the identified first pixel 431 in the image frame 402.

The ground truth colour value from the one or more background image frames 401*b* may be a value taken over time to produce an average value. The ground truth value may be stored in memory.

The ground truth may be a heatmap that is built up over time. If some of the one or more background image frames 401*b* comprises the object 410 then the one or more background image frames 401*b* may be averaged to not contain any significant reflection of the object 410.

Action 1008 may be repeated for multiple identified first pixels 431.

Figure 11:
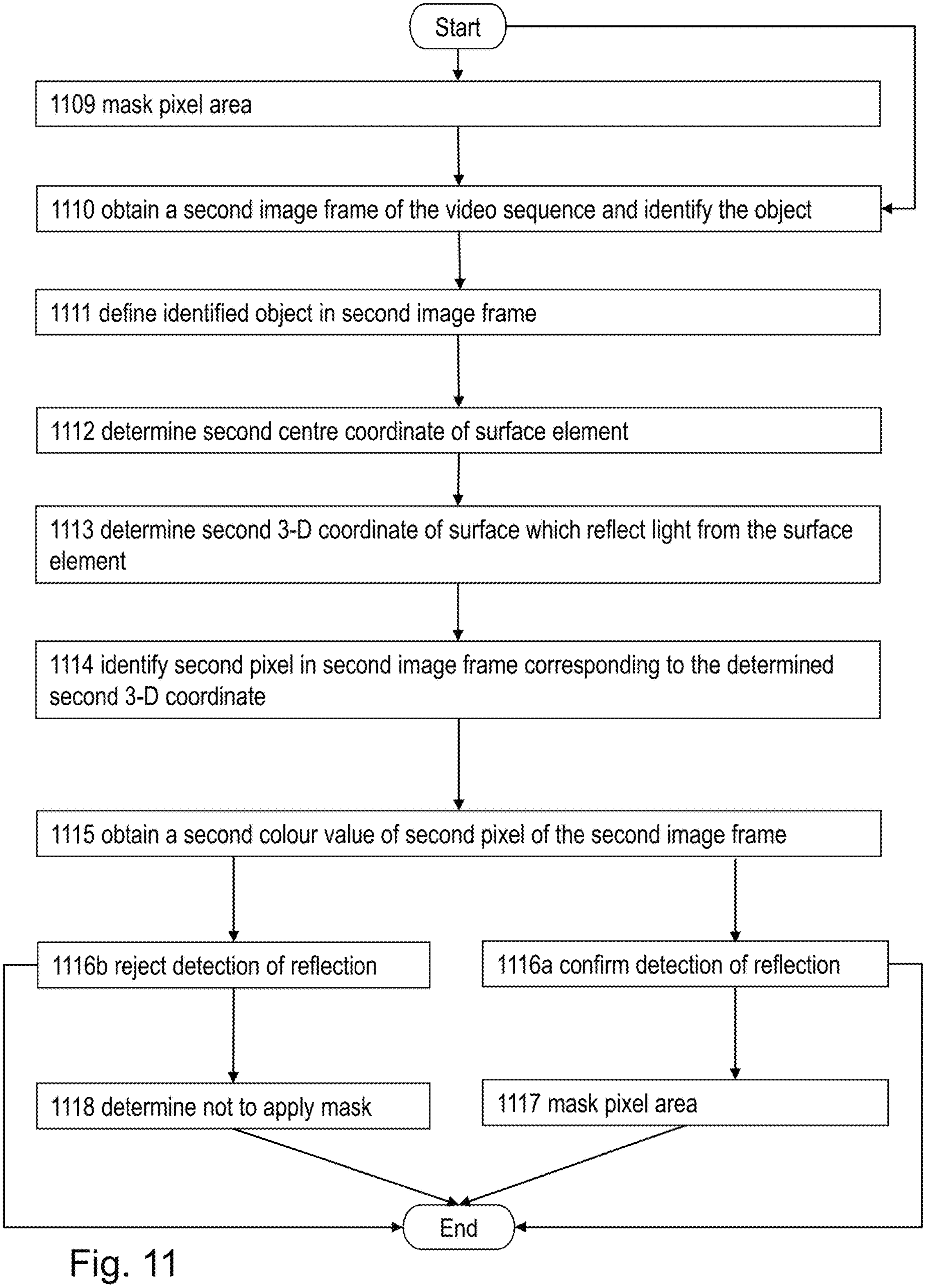
FIG. 11 is a flowchart illustrating embodiments of a method in an image-processing device.

FIG. 11 illustrates a further flowchart describing a further method performed in the image-processing device for detecting the reflection of the identified object 410 in the image frame 402 captured by the camera 120. The method of FIG. 11 is also for masking a pixel area that has been determined to represent a reflection of the object 410.

The method of FIG. 11 may be performed by the image-processing device, such as the video camera 120 or the video server 260.

The below actions may be taken in any suitable order, e.g., in another order than the order presented below.

Action 1109

In response to detecting the reflection of the object 410 the image-processing device applies a mask to a pixel area 441 of the image frame 402. The pixel area 441 comprises the identified first pixel 431. The pixel area 441 is illustrated in FIG. 9*b*. As mentioned above in relation to action 1008 image-processing device 120, 260 detects the reflection of the object 410 in the image frame 402 when a mixing of the first colour value of the identified first pixel 431 and the colour value of the surface element 417 of the object 410 and the ground truth colour value of the identified first pixel 431 fulfils the mixing criteria. For example, if the colour value of the identified first pixel 431 of the background image frame 401*b* is roughly an addition of the colour value of the surface element 417 of the object 410 and the ground truth colour value, then the identified first pixel 431 and surrounding pixels of the pixel area 441 may be masked.

Figure 12:
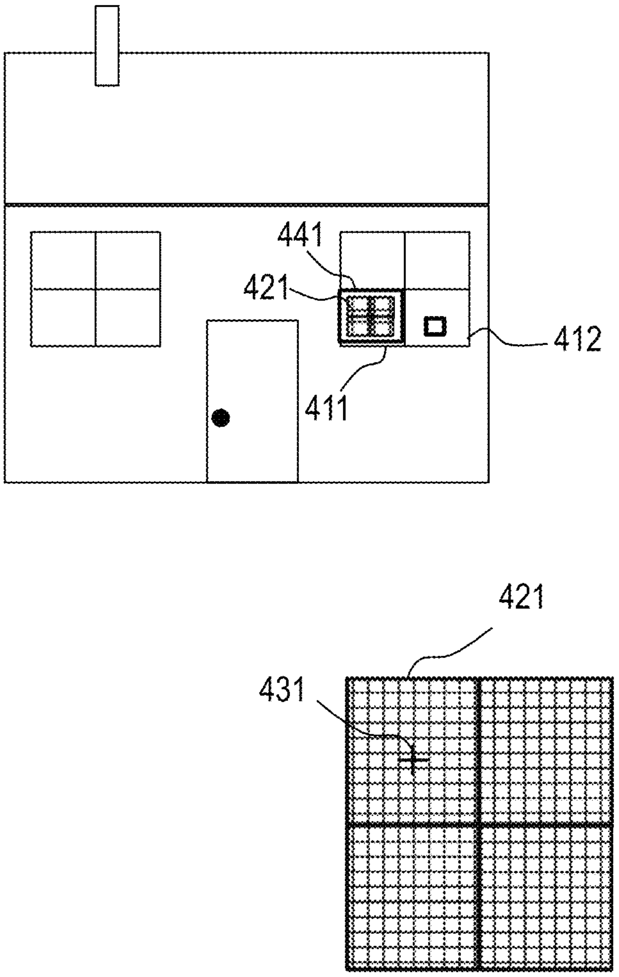
FIG. 12 is a schematic block diagram illustrating further embodiments of a method in the image-processing device.

FIG. 12 schematically illustrates the part of the background model which comprises the first reflective surface 411. FIG. 12 further schematically illustrates parts of the background image frame 401*b*, overlaid on the background model, which correspond to at least the part of the first reflective surface 411. In some embodiments herein the masked pixel area 441 comprises all pixels corresponding to a projection 421 of the surface element 417 of the three-dimensional bounding box 415 onto the surface 411 or the second surface 412 in the three-dimensional model of the background scene. In some embodiments herein the masked pixel area 441 is limited to the pixels corresponding to the projection 421 of the surface element 417 of the three-dimensional bounding box 415 onto the surface 411 or the second surface 412. The projection is reflected into the camera 120. The projection 421 and an enlarged view of the projection 421 is also illustrated in FIG. 12. The enlarged view of the projection 421 has been illustrated as filled with pixels of the image frame 402 which correspond to the part of the surface 411 which is covered by the projection 421. Thus, the masked pixel area 441 may comprise the pixels of the image frame 402 which correspond to the part of the surface 411 which is covered by the projection 421.

Figure 13:
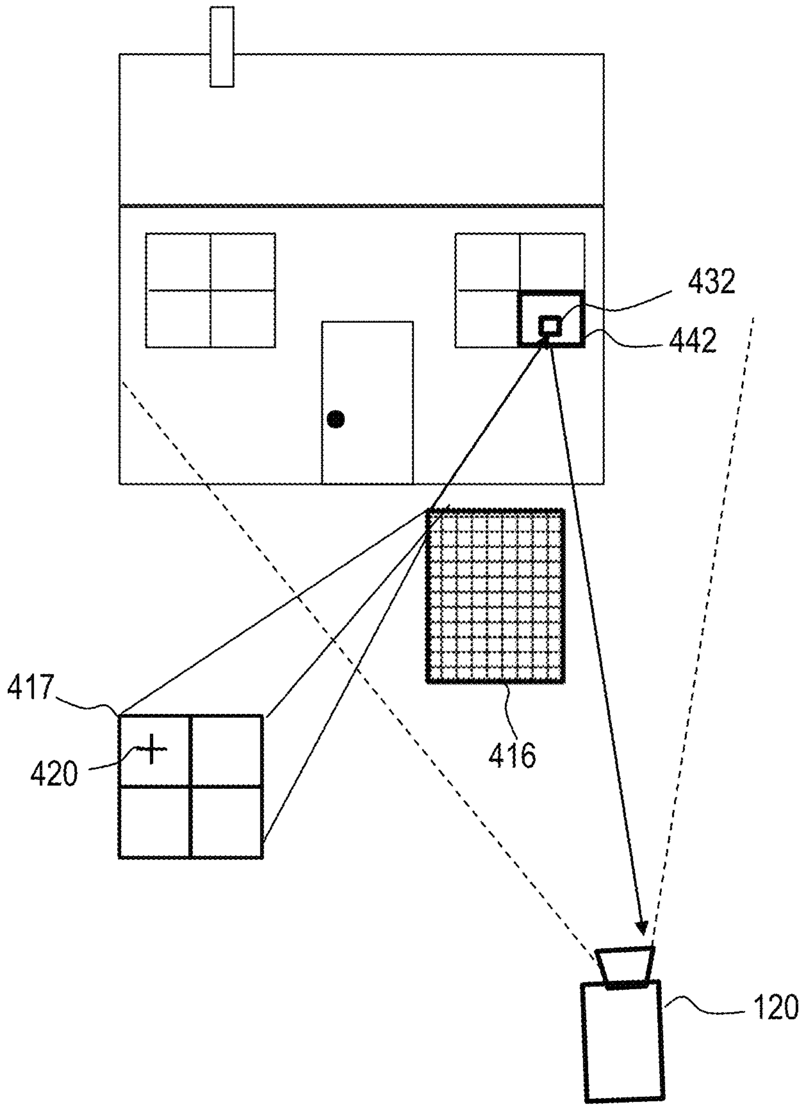
FIG. 13 is a schematic block diagram illustrating further embodiments of a method in the image-processing device.

A method for corroborating the detection of the reflection of the identified object 410 in the image frame 402 will now be described with reference to FIG. 11 and FIG. 13 and may be performed by analysing whether or not the detected reflection moves between the first image frame 402 and at least a further image frame, such as the second image frame 403.

The below method may be triggered when motion of the object 410 has been detected based on the second image frame 403 and the image frame 402.

The image-processing device 120, 260 may increase a probability value of having found a reflection of the object 410 if both motion of the object 410 and motion of the reflection is detected.

Action 1110

In some embodiments herein the image-processing device 120, 260 obtains the second image frame 403 of the video sequence 400 comprising the image frame 402. The second image frame 403 comprises the identified object 410. The second image frame 403 may be an image frame following directly after the first image frame 402 in the video sequence 400.

Action 1111

The image-processing device 120, 260 defines the identified object 410 in the second image frame 403 based on image information in the second image frame 403.

Action 1112

The image-processing device 120, 260 determines a respective second centre coordinate 420 of the surface element 417 of the three-dimensional bounding box 415 of the object 410 in the three-dimensional model of the background scene based on an obtained second position of the object 410 in the three-dimensional model. The second position of the object 410 in the three-dimensional model may be obtained in the same way as described above in relation to action 1004*b*. The second position of the object 410 in the three-dimensional model may correspond to a position of the object 410 in the second image frame 403.

Action 1113

The image-processing device 120, 260 determines a second three-dimensional coordinate of the surface 411 or of the second surface 412 in the three-dimensional model of the background scene, which reflect light from the surface element 417 of the three-dimensional bounding box 415 of the object 410 into the camera 120 and differs from the determined three-dimensional coordinate of the surface 411.

The determining is performed by tracing rays from the second centre coordinate 420 of the surface element 417 and based on a second normal of the surface 411 or of the second surface 412 in the three-dimensional model of the background scene at said second three-dimensional coordinate.

Action 1114

The image-processing device 120, 260 identifies a second pixel 432 in the second image frame 403 which corresponds to the determined second three-dimensional coordinate of the surface or of the second surface 412.

Action 1115

The image-processing device 120, 260 obtains a second colour value of the second pixel 432. The second colour value of the second pixel 432 may be stored.

Action 1116*a*

The image-processing device 120, 260 may confirm detection of the reflection of the object 410 when a mixing of the first colour value and the second colour value fulfils a second mixing criteria.

For example, for the next frame 403 look at the saved three-dimensional position from the previous frame 402, and compare the saved colour value to its current colour value. If there is a change roughly corresponding to the colour of the object 410, it is a strong indication that the reflection is moving. If this is concluded, it indicates that the area is reflective, which may increase a probability to add a mask.

Action 1116*a*

In some other embodiments herein the image-processing device 120, 260 rejects detection of the reflection of the object 410 when the mixing of the first colour value and the second colour value does not fulfil the second mixing criteria. A colour value of the first pixel 431 in the second image frame 403 equals the first colour value.

Thus, if the second colour value is different from the first colour value, but the colour value of the pixel area that was analysed for the previous frame 402 is the same, this indicates a false positive.

This means that the object is moving, but there is not a moving reflection. If the object is moving, but the reflection is not, this indicates a false positive and removal of the reflective mask at this area may be considered.

Action 1117

In response to confirming detection of the reflection of the object 410, the image-processing device 120, 260 may apply a mask to a second pixel area 442 of the second image frame 403. The second pixel area 442 comprises the identified second pixel 432. In some embodiments herein the masked second pixel area 442 is limited to the pixels corresponding to a second projection of the surface element 417 of the three-dimensional bounding box 415 onto the surface 411 or the second surface 412.

Action 1118

In response to rejecting detection of the reflection of the object 410, the image-processing device 120, 260 may determine to not apply a mask to the second pixel area 442 comprising the identified second pixel 432.

Figure 14:
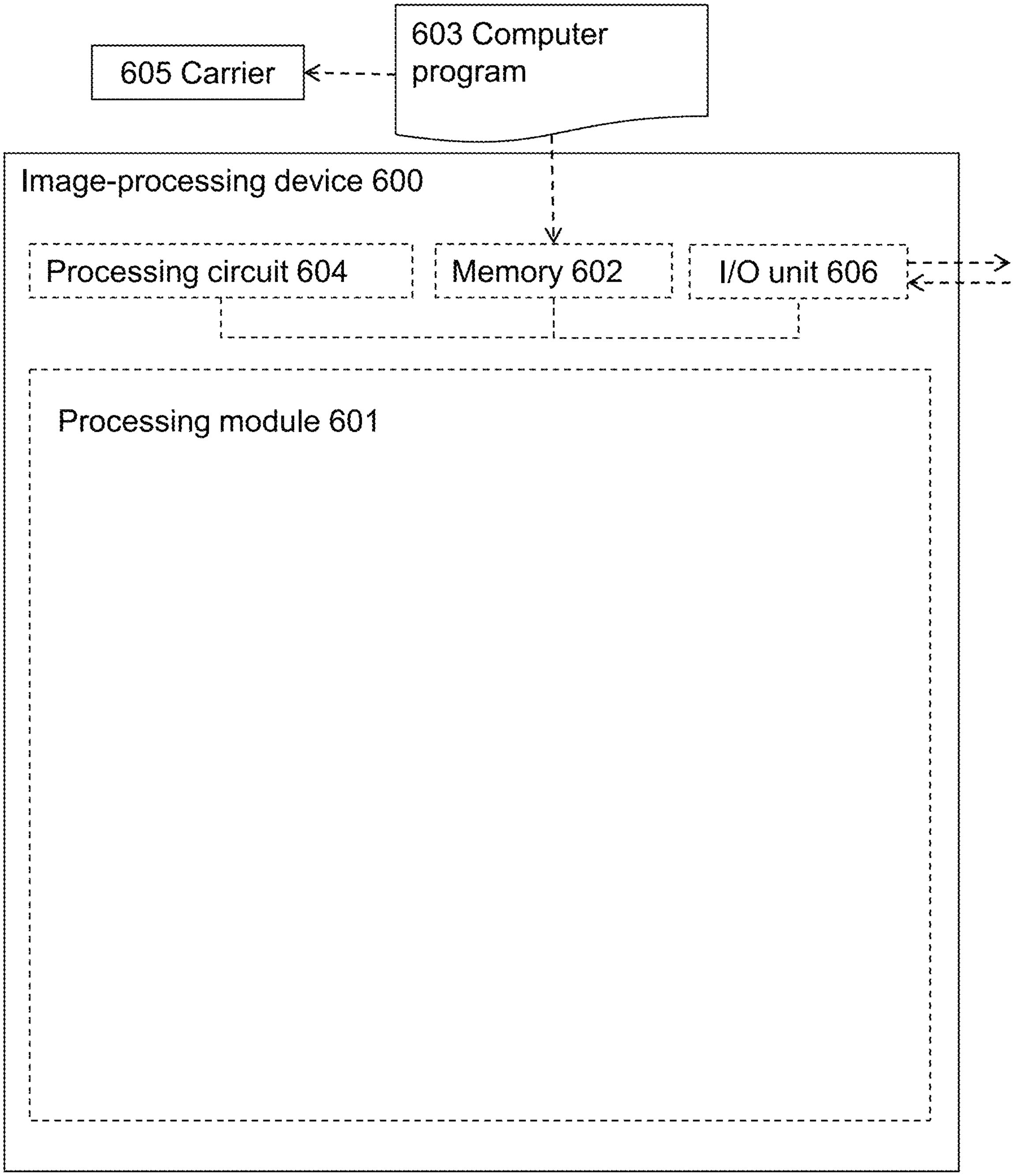
FIG. 14 is a schematic block diagram illustrating embodiments of the image-processing device.

With reference to FIG. 14, a schematic block diagram of embodiments of an image-processing device 600 is shown. The image-processing device 600 corresponds to any of the image-processing devices of FIG. 1 or FIG. 2. Thus, the image-processing device 600 may comprise or be any of a camera, such as a surveillance camera, a monitoring camera, a camcorder, a network video recorder, and the wireless communication device 130. In particular, the image-processing device 600 may be the camera 120, such as a surveillance video camera, or the video-server 260.

As mentioned above, the image-processing device 600 is configured to perform the method according to FIG. 10 or FIG. 11.

The image-processing device 600 may further comprise a processing module 601, such as a means for performing the methods described herein. The means may be embodied in the form of one or more hardware modules and/or one or more software modules.

The image-processing device 600 may further comprise a memory 602. The memory may comprise, such as contain or store, instructions, e.g. in the form of a computer program 603, which may comprise computer readable code units which when executed on the image-processing device 600 causes the image-processing device 600 to perform the methods described above, for example in relation to FIG. 10 or FIG. 11.

The image-processing device 600 may comprise a computer and then the computer readable code units may be executed on the computer and cause the computer to perform the method of FIG. 10 or FIG. 11.

According to some embodiments herein, the image-processing device 600 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-processing device 600 is operative to perform the methods of FIG. 10 or FIG. 11 as described above. As another example, the instructions, when executed by the image-processing device 600 and/or the processing circuit 604, may cause the image-processing device 600 to perform the methods according to FIG. 10 or FIG. 11.

In view of the above, in one example, there is provided an image-processing device 600 for detecting the reflection of the identified object 410 in the image frame 402 captured by the camera 120.

Again, the memory 602 contains the instructions executable by said processing circuit 604 whereby the image-processing device 600 is operative for performing the method according to FIG. 10 or FIG. 11.

FIG. 6 further illustrates a carrier 605, or program carrier, which comprises the computer program 603 as described directly above. The carrier 605 may be one of an electronic signal, an optical signal, a radio signal and a computer readable medium.

Moreover, the processing module 601 may comprise an Input/Output unit 606. According to an embodiment, the Input/Output unit 606 may comprise an image sensor configured for capturing the raw video frames described above such as the raw video frames comprised in the video stream 310 from the image sensor 301.

According to the various embodiments described above, the image-processing device 600 and/or the processing module 601 is configured to generate a three-dimensional model of a background scene of the image frame 402 based on obtained three-dimensional information about the background scene.

The image-processing device 600 and/or the processing module 601 is further configured to define the identified object 410 in the image frame 402 based on image information in the image frame 402.

The image-processing device 600 and/or the processing module 601 is further configured to define the identified object 410 in the image frame 402 based on image information in the image frame 402.

The image-processing device 600 and/or the processing module 601 is further configured to define a three-dimensional bounding box 415 of the defined object 410 in the three-dimensional model of the background scene. The three-dimensional bounding box 415 may be based on the defined object 410 in the image frame 402, an obtained position of the object 410 in the three-dimensional model and by extrapolating the defined object 410 in a plane extending along the normal of the image plane.

The image-processing device 600 and/or the processing module 601 is further configured to defining surface elements 416 of the three-dimensional bounding box 415, a respective surface element 416 being defined by a centre coordinate 418 in the three-dimensional model of the background scene and a colour value.

The image-processing device 600 and/or the processing module 601 is further configured to determine a three-dimensional coordinate of a surface 411 in the three-dimensional model of the background scene which reflects light from a surface element 416 of the three-dimensional bounding box 415 of the object 410 into the camera 120, wherein the determining is performed by tracing rays from the centre coordinate 418 of the surface element 416 of the three-dimensional bounding box 415 of the object 410 and based on a normal of the surface in the three-dimensional model of the background scene at said three-dimensional coordinate.

The image-processing device 600 and/or the processing module 601 is further configured to identifying a first pixel 431 in the image frame 402 which corresponds to the determined three-dimensional coordinate of the surface 411.

The image-processing device 600 and/or the processing module 601 is further configured to detecting the reflection of the object 410 in the image frame 402 when a mixing of a first colour value of the identified first pixel 431 and the colour value of the surface element 416 of the object 410 and a ground truth colour value of the identified first pixel 431 fulfils a mixing criteria.

The image-processing device 600 and/or the processing module 601 is further configured to, in response to detecting the reflection of the object 410, apply a mask to a pixel area 441 of the image frame 402, the pixel area 441 comprising the identified first pixel 431.

In some embodiments herein the image-processing device 600 and/or the processing module 601 is configured to obtain the second image frame 403 of the video sequence 400 comprising the image frame 402, the second image frame 403 comprising the identified object 410, and define the identified object 410 in the second image frame 403 based on image information in the second image frame 403, and determine a respective second centre coordinate 420 of the surface element 416 of the three-dimensional bounding box 415 of the object 410 in the three-dimensional model of the background scene based on an obtained second position of the object 410 in the three-dimensional model, and determine the second three-dimensional coordinate of the surface 411 or of the second surface 412 in the three-dimensional model of the background scene, which reflect light from the surface element 416 of the three-dimensional bounding box 415 of the object 410 into the camera 120 and differs from the determined three-dimensional coordinate of the surface 411, wherein the determining is performed by tracing rays from the second centre coordinate 420 of the surface element 416 and based on a second normal of the surface 411 or of the second surface 412 in the three-dimensional model of the background scene at said second three-dimensional coordinate, and identify a second pixel 432 in the second image frame 403 which corresponds to the determined second three-dimensional coordinate of the surface or of the second surface 412, and obtain a second colour value of the second pixel 432, and confirm detection of the reflection of the object 410 when a mixing of the first colour value and the second colour value fulfils a second mixing criteria, or reject detection of the reflection of the object 410 when the mixing of the first colour value and the second colour value does not fulfil the second mixing criteria, a colour value of the first pixel 431 in the second image frame 403 equals the first colour value.

In some embodiments herein the image-processing device 600 and/or the processing module 601 is configured to, in response to confirming detection of the reflection of the object 410, apply a mask to a second pixel area 442 of the second image frame 403, the second pixel area 442 comprising the identified second pixel 432.

In some embodiments herein the image-processing device 600 and/or the processing module 601 is configured to, in response to rejecting detection of the reflection of the object 410, determine to not apply a mask to the second pixel area 442 comprising the identified second pixel 432.

In some embodiments herein the image-processing device 600 and/or the processing module 601 is configured to extrapolate the object 410 by being configured to extrapolate bounding pixels of the object 410 from the captured image frame 402.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image-processing device, for detecting a reflection of an identified object in an image frame captured by a camera, the method comprising:

generating a three-dimensional model of a background scene of the image frame based on obtained three-dimensional information about the background scene;

defining the identified object in the image frame based on image information in the image frame;

defining a three-dimensional bounding box of the defined object in the three-dimensional model of the background scene;

defining surface elements of the three-dimensional bounding box, a respective surface element being defined by a centre coordinate in the three-dimensional model of the background scene and a colour value;

determining a three-dimensional coordinate of a surface in the three-dimensional model of the background scene which reflects light from a surface element of the three-dimensional bounding box of the object into the camera, wherein the determining is performed by tracing rays from the centre coordinate of the surface element of the three-dimensional bounding box of the object and based on a normal of the surface in the three-dimensional model of the background scene at said three-dimensional coordinate;

identifying a first pixel in the image frame which corresponds to the determined three-dimensional coordinate of the surface;

detecting the reflection of the object in the image frame when a mixing of a first colour value of the identified first pixel and the colour value of the surface element of the object and a ground truth colour value of the identified first pixel fulfils a mixing criteria; and in response to detecting the reflection of the object applying a mask to a pixel area of the image frame, the pixel area comprising the identified first pixel.

2. The method according to claim 1, wherein the ground truth colour value is obtained from one or more background image frames or from one or more neighbouring pixels to the identified first pixel in the image frame.

3. The method according to claim 1, further comprising:

obtaining a second image frame of a video sequence comprising the image frame, the second image frame comprising the identified object;

defining the identified object in the second image frame based on image information in the second image frame;

determining a respective second centre coordinate of the surface element of the three-dimensional bounding box of the object in the three-dimensional model of the background scene based on an obtained second position of the object in the three-dimensional model;

determining a second three-dimensional coordinate of the surface or of a second surface in the three-dimensional model of the background scene, which reflect light from the surface element of the three-dimensional bounding box of the object into the camera and differs from the determined three-dimensional coordinate of the surface, wherein the determining is performed by tracing rays from the second centre coordinate of the surface element and based on a second normal of the surface or of the second surface in the three-dimensional model of the background scene at said second three-dimensional coordinate;

identifying a second pixel in the second image frame which corresponds to the determined second three-dimensional coordinate of the surface or of the second surface;

obtaining a second colour value of the second pixel; and confirming detection of the reflection of the object when a mixing of the first colour value and the second colour value fulfils a second mixing criteria; or rejecting detection of the reflection of the object when the mixing of the first colour value and the second colour value does not fulfil the second mixing criteria, a colour value of the first pixel in the second image frame equals the first colour value.

4. The method according to claim 3, further comprising: in response to confirming detection of the reflection of the object, applying a mask to a second pixel area of the second image frame, the second pixel area comprising the identified second pixel.

5. The method according to claim 3, further comprising: in response to rejecting detection of the reflection of the object, determining to not apply a mask to the second pixel area comprising the identified second pixel.

6. The method according to claim 1, wherein the masked pixel area comprises all pixels corresponding to a projection of the surface element of the three-dimensional bounding box onto the surface or the second surface in the three-dimensional model of the background scene, which projection is reflected into the camera.

7. The method according to claim 1, wherein the three-dimensional information about the background scene comprises three-dimensional coordinates of surfaces in the background scene, a respective normal vector of the surfaces, three-dimensional coordinates of the camera and an orientation of the camera.

8. The method according to claim 1, wherein the colour value is a hue value or a combination of Cb and Cr values in the YUV format.

9. The method according to claim 1, wherein extrapolating the object is performed by extrapolating bounding pixels of the object from the captured image frame.

10. The method according to claim 1, wherein a respective surface element of the three-dimensional bounding box corresponds to multiple pixels from the captured image frame and wherein the colour value of the respective surface element is calculated as an average of colour values of the corresponding multiple pixels.

11. An image-processing device configured to perform the method according to claim 1.

12. The image-processing device according to claim 11, wherein the image-processing device is a video camera, such as a surveillance camera, or a video-server.

13. A non-transitory computer readable medium that has a computer program, stored therein comprising computer readable code units which when executed on an image-processing device causes the image-processing device to perform the method according to claim 1.

* * * * *